Patented Nov. 8, 1949

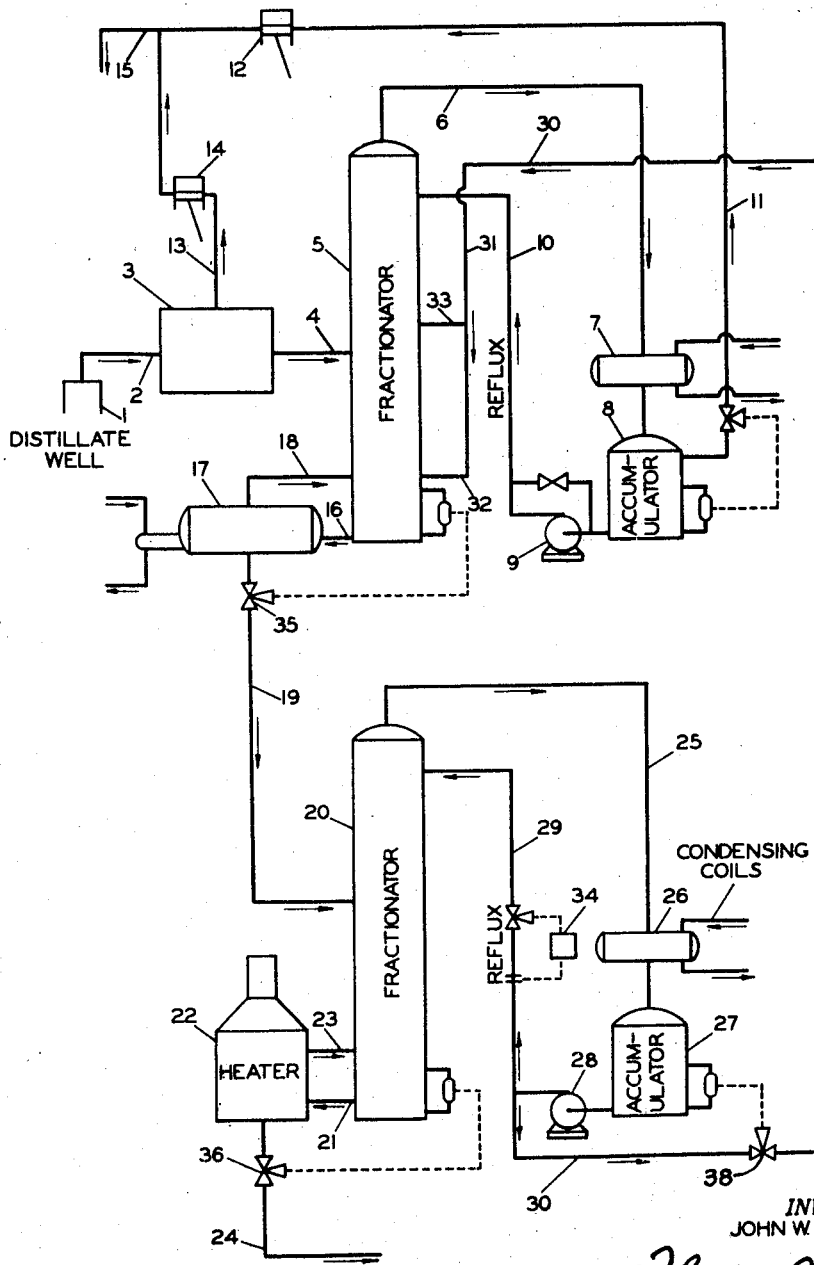

2,487,147

UNITED STATES PATENT OFFICE 2,487,147

FRACTIONATING METHANE AND ETHANE FROM HYDROCARBON MIXTURES

John W. Latchum, Jr., Bartlesville, Okla., assignor to Phillips Petroleum Company, a corporation of Delaware Application March 22, 1946, Serial No. 656,474

1 Claim. (Cl. 196—11)

This invention relates to the recovery of high pressure distillates. In one of its more specific aspects it relates to a method for the recovery of stabilized distillates with the simultaneous separation of gas from distillate well effluent at a relatively high pressure for recycling with a minimum of compression.

One of the major difficulties in the design and operation of distillate plants has been the provision for and the elimination of the high concentration of methane and ethane in the liquid, available either as a distillate condensate or rich oil, the latter in the case of an absorption plant. To date, flashing to lower pressures, with subsequent recompression of the evolved gas and the stabilization of the distillate at low pressures series absorption after flashing and desorption, have been the methods used to remove this excessive methane and ethane concentration, with subsequent lowering of pressure so that separation may be made at low pressures as is common in the art. These methods all require huge compressor and other equipment investments, together with loss of pressure on the gas, incomplete elimination of the methane and ethane, which in efficient operation necessitates further fractionation steps, extra steam and other costs.

An object of my invention is to accomplish the separation of methane and ethane from a well distillate with less loss in gas pressure than commonly experienced.

Another object of my invention is to accomplish this aforesaid separation by the use of a process requiring less equipment and therefore less capital investment and operating costs by fractionation of the distillate at about the same as it is recovered from the well effluent.

Still another object of my invention is to accomplish the separation of methane and ethane from a well distillate in a fractionator in which a high pressure is maintained for the separation.

Still other objects and advantages of my process will be apparent to those skilled in such art from a careful study of the following disclosure and attached drawing which respectively describes and illustrates one embodiment of my invention.

The drawing is a diagrammatic elevation of the apparatus used in the practice of the process of my invention.

Referring to the drawing, a high pressure distillate well effluent originating in a well 1, passes through a field line 2 into a recovery unit 3 in which condensible hydrocarbons are recovered from the well effluent. This recovery unit 3 may be a retrograde condensation unit or a high pressure absorption system or other type of recovery unit suitable for the recovery of condensible and natural gasoline type hydrocarbons at high pressures.

The condensate at high pressure passes from its recovery unit 3 through a feed line 4 into a high pressure fractionator 5 at about a mid-point. In this fractionator separation takes place and the methane and ethane pass overhead at a high pressure through a vapor line 6, condenser 7 and condensate accumulates in the reflux accumulator 8. That condensate needed for tower refluxing purposes is transferred by a pump 9 through a reflux line 10 into the top tray of the tower. Uncondensed gases, for example, mainly methane with some ethane, and at a high pressure, are passed from the top of the reflux accumulator through a gas line 11, are compressed by a compressor 12 and added to some other high pressure gas separated in the separating unit 3. The latter gas is passed from said separation unit through a gas line 13, pressured by a compressor 14. The gases from these two sources are joined in a recycle gas line 15 through which the gas passes to an input well for pressure maintainance and recycling purposes.

The fractionator 5 bottoms which contains a large excess of ethane with the C3 and higher boiling hydrocarbons, as an intermediate kettle product passes from the fractionator through a line 16 into a heater or reboiler 17, a portion being returned to the fractionator through a line 18 and the remainder passing through a line 19 into a second fractionator 20 at about a midpoint thereof.

From this second fractionator is taken a bottoms product through a line 21, which product is passed through a heater 22, a portion of the heated bottoms is passed through a return line 23 into the column and the remainder passes through a transfer line 24 to a fractionator column, not shown, for separating hydrocarbons from one another or for making a certain grade of natural gasoline, as desired.

Overhead gas, consisting mainly of ethane issues overhead from this second column 20 through a vapor line 25, a condenser 26 and condensate is received in a reflux accumulator 27. From the accumulator liquid for refluxing the column is pumped by a pump 28 through a reflux line 29 onto the top tray. The excess liquid, or that not required for refluxing, passes from the accumulator 27 under pressure from the pump 28 through a line 30 to the fractionator 5. For addition or introduction into this latter vessel the fluid from line 30 passes into a distributing line 31 from which it passes into the column through an inlet line 32 or 33 or both.

The pump 28 serves to transfer liquid as reflux to column 20 and to transfer the excess of this same material through line 30 to column 5. Since the operating pressure in tower 5 is greater than in column 20, the quantity of reflux passing through the line 29 is controlled by a flow controller mechanism 34.

A float controller apparatus in the base of tower 5 operates a valve 35 in line 19 to maintain a desired constant liquid level in this tower, while a corresponding float apparatus in tower 20 operates a valve 36 in line 24 to maintain a desired and constant liquid level therein.

A float controller in the accumulator tank 27 operates a valve 38 in line 30 to maintain a constant liquid level in said accumulator.

In the operation of the hereinbefore described apparatus according to the process of my invention, a distillate well effluent flows from the well 1 through the line 2 to the condensate recovery unit 3. From this unit the liquid condensate containing easily volatile natural gasoline type hydrocarbons with normally gaseous hydrocarbons such as propane, ethane and methane dissolved therein passes through line 4 into the fractionator 5. The relative proportions of these latter gases dissolved in the liquid of course depend upon the pressure and temperature of the separation, and on the type of separation unit or method employed.

In the fractionator 5 methane and ethane are taken overhead through the vapor line 6. These gases are passed through the condenser 7 in which a condensate containing predominantly ethane is produced, the condensate accumulating in the accumulator tank 8. Uncondensed gas which consists largely of methane with some ethane is taken from the top of this accumulator through the "off-gas" line 11 and compressed by the compressor 12 and poured through the high pressure gas line 15 to an input gas well or wells for recycling purposes.

The bottoms which accumulate in the base of the fractionator 5 is given reboiling heat in the adjacent kettle 17, the warmed or heated liquid being passed through line 18 into the column while the "make" liquid passes through line 19 into the fractionator 20 as feed. The flow of this liquid is controlled by the valve 35 which in turn is actuated by the float controller mechanism in the base of the fractionator 5.

In the fractionator 20 a separation is made between ethane and the remaining higher boiling hydrocarbons, the former of course passing off as overhead vapors and the latter as kettle product. This overhead ethane passes through the line 25, the condenser 26, the condensate therefrom accumulating in the accumulator tank 27. Liquefied ethane then passes from this accumulator through pump 28, a portion thereof going through the flow controller 34 and line 29 into the fractionator as reflux while the remainder passes through the line 30 containing valve 38 into the distribution header 31. From this latter line the ethane is passed through one or more inlets 32, 33, into the lower or approximately mid portion of the fractionator 5. The addition of ethane to the fractionator 5 assists in maintaining a higher than normal pressure in this vessel, which operation results in the separation of methane with some ethane at such a pressure as to decrease materially recycling compression costs.

I propose according to my invention to maintain a quantity of ethane in the recycle circuit, and since this quantity will remain substantially constant, all the ethane then coming with the feed stock will pass out with the residue gas. The only time that the amount of ethane in the residue gas will vary is during the time that the ethane recycle is being built up, and as soon as the required amount of ethane is accumulated, then all the ethane coming with the feed stock passes overhead from the fractionator 5.

To illustrate more specifically the application of my process to the treatment of a particular feed stock, I have included herein the following examples:

Example I

A condensate well effluent is produced from the well at approximately 1800 pounds pressure per square inch, and condensible hydrocarbons removed therefrom by retrograde condensation means. In this condensation step the pressure on the charge stock is reduced to approximately 870 pounds per square inch, and at this pressure condensate as feed stock passes into the fractionating column 5. With the actually condensed hydrocarbons is a considerable proportion of dissolved gases such as methane and ethane. The following tabulation illustrates in an empirical manner the composition of the condensate feed stock, the fractionator overhead gases and bottoms material

|  | Feed Stock, mol. per cent | Column 5 | | | |
| --- | --- | --- | --- | --- | --- |
|  |  | Overhead | | Bottoms | |
|  |  | Weight per cent | Mol. per cent | Weight per cent | Mol. per cent |
| $C_1$ | 51.80 | 88 | 93.5 |  |  |
| $C_2$ | 7.12 | 12 | 6.5 |  |  |
| Ave. of $C_7$ | 41.08 |  |  | 88 | 96 |
|  |  |  |  | 12 | 4 |

The accumulator 8 temperature was −85° F., the kettle temperature was +105° F., at a column pressure of 870 pounds per square inch absolute.

The column bottoms passes to the second column 20 as feed stock and from the feed the ethane is removed leaving the average $C_7$ product as bottoms to be removed and disposed of as desired. It may, however, be fractionated further in constituent hydrocarbons or may be marketed as a low vapor pressure natural gasoline. The ethane overhead from this second column contained from 99 to 99.5 mol. per cent ethane, the remainder being mostly propane. This product was condensed and some was used to reflux the ethane column while the remainder as liquid was returned to the high pressure column 5 and introduced at the two points (32 and 33). In this manner the pressure in this column was maintained at 870 pounds.

A fractionator column operated on the same charging stock and producing an overhead gas of the same composition with only the average $C_7$ hydrocarbons as bottoms product, was operated under the following conditions:

Column accumulator temperature\_\_\_\_°F\_\_  −150
Column kettle temperature_____°F\_\_  +509
Column pressure, absolute \_lbs. per sq. in\_  395

By comparison of these operating conditions it will be observed that the operating pressure is considerably lower than when using the ethane recycle. The accumulator temperature and therefore the top tower temperature is considerably lower, as well as the reboiler temperature is considerably higher. Thus by being able to operate such a column at appreciably more favorable conditions when using the ethane recycle than when not using it, the overall operating costs are materially reduced.

A further and marked advantage is the reduction in gas recompression costs for recycling the overhead gas into the high pressure producing formation.

*Example II*

A feed stock somewhat similar to that given in the above example but containing less of the heavier hydrocarbons was charged to a fractionator 5 for separation of an overhead methane-ethane product and the production of "wild natural gasoline" type bottoms product having an approximate average composition of $C_4$ hydrocarbons. The products and operating conditions when using the ethane recycle were as follows:

|  | Overhead | | Bottoms | | |
| --- | --- | --- | --- | --- | --- |
|  | Weight per cent | Mol. per cent | Weight per cent | Mol. per cent | |
| $C_1$ | 88 | 93.5 |  |  | Column Ave. Temp., −105° F. |
| $C_2$ | 12 | 6.5 | 88 | 91.7 | Column Kettle Temp., +90° F. |
| Ave. $C_4$ |  |  | 12 | 8.3 | Column Pressure, 725 lbs. per sq. in. abs. |

When operating with a single column and not using an ethane recycle, the following conditions were required to produce a similar overhead gas and an average $C_4$ hydrocarbon bottoms:

Column accumulator temperature____°F__ −125
Column kettle temperature _____°F__ +205
Column pressure_____lbs. per sq. in. abs__ 575

From an inspection of this pressure and operating temperature in comparison to those when using an ethane recycle it will be observed that this latter operation is the far more economical. And further, the pressure of 725 pounds requires less recompression for recycling into an input well.

The conditions of operation of the ethane fractionator 20 may be more or less conventional, the purpose of this fractionator being to separate a relatively pure ethane overhead for recycling into the main fractionator tower as the pressure maintenance liquid and the operation of this tower may be carried out under such conditions as will accomplish this purpose.

Most of the valves, controllers, recorders and the like which would be used in modern installations are not shown herein, for purposes of simplicity. The use of such auxiliary equipment is well understood by those versed in this art.

Materials of construction need not be special but may be selected from among those commercially available.

The two condensing or refrigeration means, identified by reference numerals 7 and 26 on the drawing, may be any suitable type desired, as for example "propane units." Further these two condensers may be furnished refrigerant from a common source, which operation, obviously would be more economical than when using two entirely separate units. When starting up such a system, a cut of propane may be made as overhead from the second column and this then passed into the refrigeration system, and the column operation then changed to produce the overhead ethane for recycling according to my invention.

It will be obvious to those skilled in the art that many variations and alterations in my process may be made wtihout departing from the intended spirit and scope of my invention.

I claim:

A method for fractionating dissolved methane and ethane as a gas from a volatile hydrocarbon mixture containing same at a higher pressure and at a lower reboiler temperature than normally required to give a methane-ethane overhead gas of a similar composition from a similar volatile hydrocarbon mixture comprising passing a volatile hydrocarbon mixture containing dissolved methane and ethane into a fractionator as charge stock at about a midpoint thereof, and therein fractionating said mixture and removing methane and ethane as overhead gas, and removing said volatile hydrocarbon mixture containing dissolved ethane as bottoms, passing said bottoms as charge stock into a second fractionator and therefrom removing said volatile hydrocarbon mixture as one product of the process and an ethane overhead product, condensing said ethane and passing condensate into the first mentioned fractionator at approximately a midpoint and passing additional condensate into the bottom portion thereof whereby said higher distillation pressure and the lower reboiler temperature are obtained and said methane and ethane overhead gas is removed at said higher than normal pressure.

JOHN W. LATCHUM, Jr.

REFERENCES CITED

The following references are of record in the file of this patent:

UNITED STATES PATENTS

| Number | Name | Date |
| --- | --- | --- |
| 1,957,818 | Carney | May 8, 1934 |
| 2,070,864 | Ragatz | Feb. 16, 1937 |
| 2,074,978 | Brandt | Mar. 23, 1937 |
| 2,138,218 | Raigorodsky | Nov. 29, 1938 |
| 2,168,316 | Brandt | Aug. 8, 1939 |
| 2,249,884 | Carney | July 22, 1941 |
| 2,301,520 | Carney | Nov. 10, 1942 |
| 2,303,609 | Carney | Dec. 1, 1942 |
| 2,307,024 | Carney | Jan. 5, 1943 |